April 1, 1969 G. W. MURPHY 3,436,058
LIQUID IMPELLING MEANS AND SEAL THEREFOR
Filed Dec. 8, 1967 Sheet 1 of 2
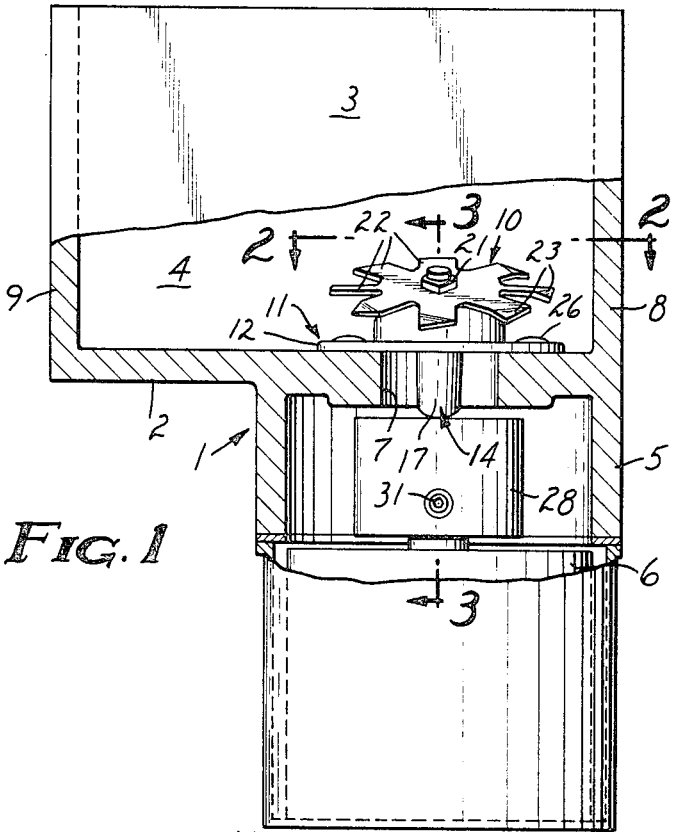
FIG. 1
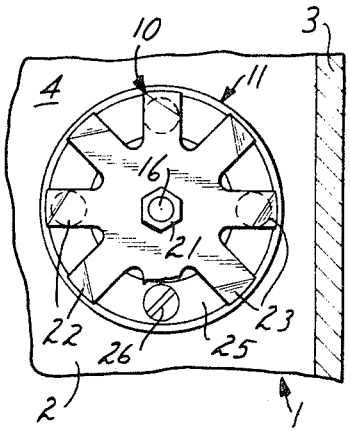
FIG. 2
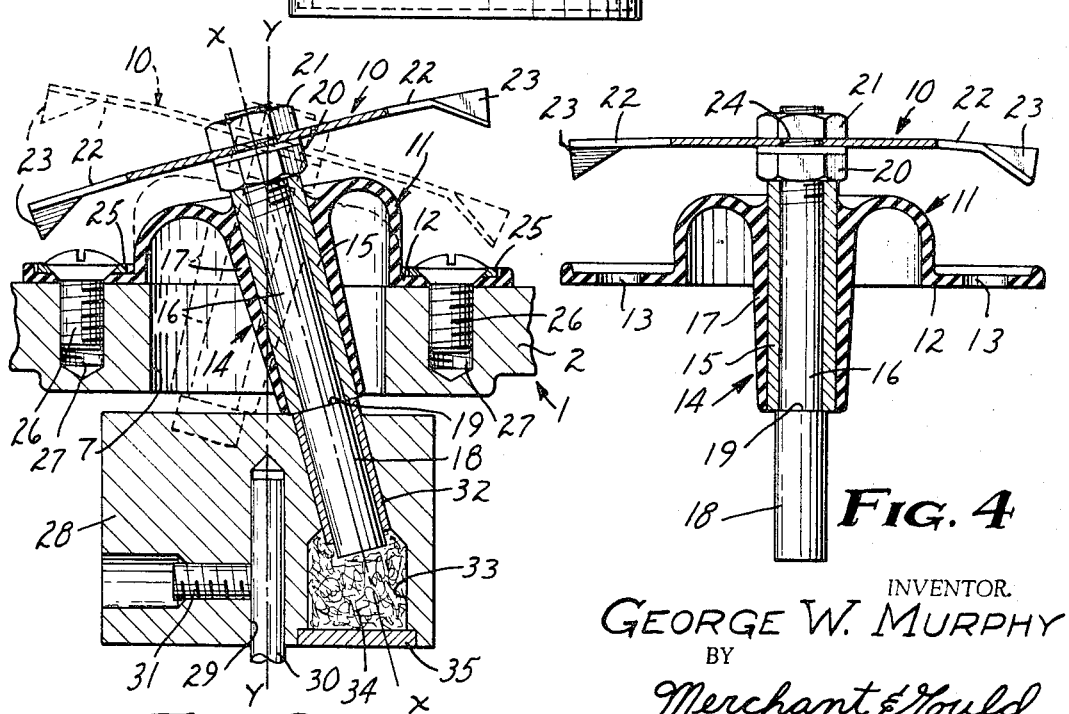
FIG. 3
FIG. 4
INVENTOR.
GEORGE W. MURPHY
BY
Merchant & Gould
ATTORNEYS

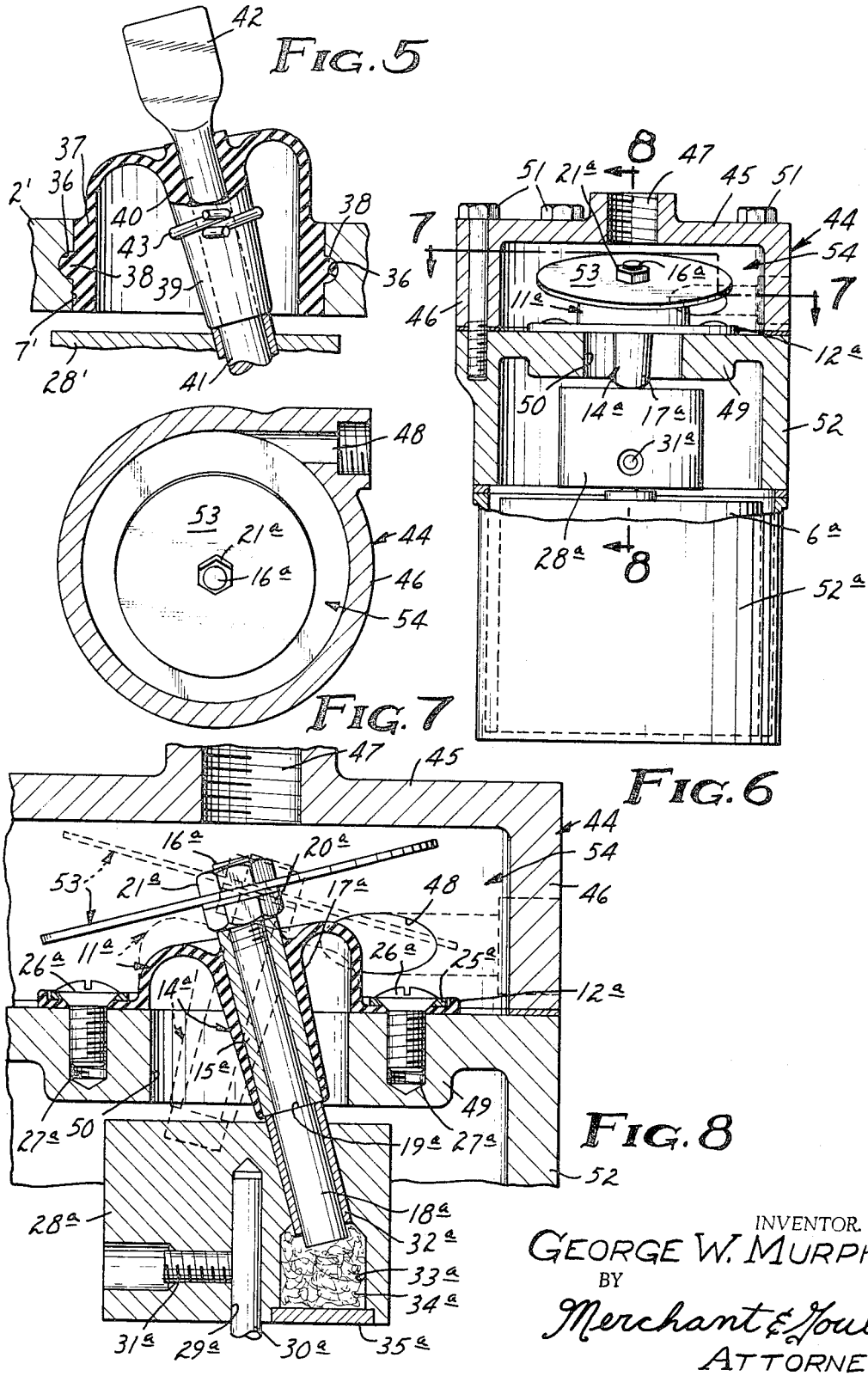

United States Patent Office 3,436,058
Patented Apr. 1, 1969

3,436,058
LIQUID IMPELLING MEANS AND SEAL THEREFOR
George W. Murphy, Minneapolis, Minn., assignor to K & K Manufacturing, Inc., Rogers, Minn., a corporation of Minnesota
Filed Dec. 8, 1967, Ser. No. 689,173
Int. Cl. B01f 7/22
U.S. Cl. 259—99    11 Claims

ABSTRACT OF THE DISCLOSURE

A flexible diaphragm seal having a core sealed thereto and normally coaxial therewith and a marginal portion for sealing engagement with a liquid chamber wall having an opening therethrough, to close said opening. The core has inner and outer end portions at opposite sides of the seal, the inner end portion having an impeller wobbler thereon and the outer end portion projecting through the wall opening. Drive means, operatively engaging said core outer end portion, angularly displaces said core from the normal axis of the seal and imparts non-rotary wobbling movement to the impeller wobbler substantially on said normal axis of the seal.

Background of the invention

Heretofore, in mixing various liquids or liquid and solid ingredients, or discharging liquids from a chamber, power driven elements, such as rotary agitators or impellers have been utilized, these usually being mounted on rotary drive shafts journalled in a chamber wall opening and requiring sealing rings of various types to prevent leakage along the drive shafts. Not only do the sealing rings impose a substantial frictional load upon the drive shafts, but they are subject to undue wear, resulting in relatively short seal life and necessitating frequent replacement of the seals.

Summary of the invention

An important object of this invention is the provision of liquid impelling means and a seal therefor, which, when the seal is sealingly attached to a wall structure of a liquid chamber at an opening through the wall structure, effectively closes and seals the opening, imposes a minimum load on drive means for the impelling means, and has a long sealing life. To this end I provide a generally cup-shaped flexible diaphragm seal having a marginal portion adapted to be sealingly anchored to the chamber wall at an opening therethrough to close and seal the opening. A rigid core, normally coaxial with the seal, is sealingly anchored thereto, and has an inner end portion disposed within the chamber when the seal is secured to the chamber wall, and an outer end portion extending through the opening in the chamber wall, the inner end portion of the core having an impeller wobbler thereon. Drive means outwardly of the chamber wall operatively engages the outer end portion of the core to angularly displace the core from its normal position coaxially of the seal, and imparts circular movement to the outer end portion of the core about the normal axis of the seal, whereby to impart non-rotary wobbling movement to the impeller wobbler substantially on said normal axis of the seal.

Description of the drawings

FIG. 1 is a view in side elevation of a mixing chamber showing the liquid impelling means and seal of this invention mounted therein, some parts being broken away and some parts being shown in section;

FIG. 2 is a fragmentary view partly in top plan and partly in section, taken substantially on the line 2—2 of FIG. 1;

FIG. 3 is an enlarged fragmentary vertical section taken substantially on the line 3—3 of FIG. 1;

FIG. 4 is an axial section of the liquid impelling means and seal therefor of this invention, in a normal unmounted condition;

FIG. 5 is a view corresponding substantially to FIG. 3, but showing a modified form of the invention;

FIG. 6 is a view corresponding to FIG. 1 but showing another modified arrangement;

FIG. 7 is a view partly in plan and partly in horizontal section, taken on the line 7—7 of FIG. 6; and FIG. 8 is an enlarged fragmentary section taken on the line 8—8 of FIG. 6.

Detailed description

In the embodiment of the invention illustrated in FIGS. 1–4, a wall structure is indicated generally by the numeral 1, the wall structure including a bottom wall 2 and an upstanding peripheral wall 3 cooperating with the bottom wall 2 to define an open-topped chamber 4. The wall structure 1 further includes a skirt portion 5 depending from the bottom wall 2 and on which is mounted a motor 6 that is preferably axially aligned with an opening 7 in the bottom wall 2. The peripheral wall 3 may be of any desired shape such as rectangular, oval or circular, and for the purpose of the present example, the opening 7 is shown as being disposed in closely spaced relationship to a portion 8 of the peripheral wall 3 and remote from an opposite portion 9 of the wall 3, for a purpose which will hereinafter be described.

The liquid impelling means and seal of this invention includes an impeller wobbler 10 and a generally cup-shaped flexible diaphragm seal 11, the seal 11 being formed to provide an annular marginal mounting flange or portion 12 having a plurality of circumferentially spaced mounting apertures 13 therein. The seal 11 is made from suitable preferably elastic material, such as rubber or the like, and is provided with an axial core 14 which comprises a tubular member 15 and a crank pin 16. As shown in FIG. 4, the core 14 is normally coaxial with the seal 11 in its normal unmounted state, the seal 11 being formed to provide an axially elongated hub portion 17 that is molded or bonded to the outer surface of the tubular member 15. The crank pin 16 is snugly received in the tubular member 15, and is provided at its outer end with an enlarged journal portion 18 which defines an annular shoulder 19 that abuts the outer end of the tubular member 15. The inner end portion of the crankpin 16 extends beyond the inner or upper end of the tubular member 15, and is screw threaded to receive a pair of lock washer equipped nuts 20 and 21. The nut 20 is tightened on the crank pin 16 to sealingly engage the adjacent end of the crank pin 16 and to pull the shoulder 19 into sealing engagement with the opposite end of the tubular member 15. In the form of the invention illustrated in FIGS. 1–4, the impeller wobbler 10 is in the form of a generally flat disk notched to provide a plurality of circumferentially spaced radially outwardly projecting teeth or blades 22 a portion of each of which is bent to provide a vane portion 23. As shown, the impeller wobbler 10 has a central opening 24 for reception of the inner threaded end portion of the crank pin 16, the nut 21 being used to rigidly anchor the impeller wobbler 10 on the crank pin 16. The marginal flange 12 is rigidly and sealingly anchored to the bottom wall 2 around the opening 7 by a rigid annular clamping plate 25 and mounting screws 26 extending through the openings 13 and suitable openings in the clamping plate 25, and screw threaded into blind threaded holes 27 in the bottom wall 2. When thus mounted on the bottom wall 2, the seal 11 effectively closes the opening 7 against leakage of liquid from the chamber 4.

Means for driving the impeller wobbler 10 comprises a generally cylindrical crank element 28 having an axial bore 29 for reception of the drive shaft 30 of the motor 6, the axis of the shaft 30 and of rotation of the crank element 28 being aligned with the normal axis of the seal 11 and core 14 thereof. The crank element 28 is rigidly secured to the motor shaft 30 by suitable means such as a setscrew or the like 31. The crank element 28 is bored to receive a sleeve bearing or the like 32, and to provide a chamber 33 below the lower end of the bearing 32 for reception of lubricant saturated wick material or the like 34, the chamber 33 being closed by a disk like plug or the like 35. The journal portion 18 of the crank pin 16 is rotatably received in the bearing 32, the bearing 32 being so situated in the crank element 28 that the entire core 14 of the seal 11 is angularly displaced from the common normal axis of the core 14 and that of rotation of the crank element 28. With reference to FIG. 3, it will be seen that the angularly displaced axis of the crank pin 16, indicated by the broken center line X—X in FIG. 3, intersects the axis of rotation of the crank element 28, indicated by the broken line Y—Y in FIG. 3, substantially at the level of the central portion of the seal 11 just below the central portion of the impeller wobbler 10.

With the above arrangement, when rotary movement is imparted to the crank element 28, the outer end or journal portion 18 of the crank pin 16 is moved in a circle around the axis Y—Y whereby to impart a generally circular wobbling movement of the impeller wobbler 10, the impeller wobbler 10 being held against rotation on the crank pin axis X—X by the flexible seal 11 being anchored to the core 14. Thus, when liquid and dry material to be mixed with the liquid are placed in the chamber 4, and the motor 6 energized, rapid wobbling movement of the impeller wobbler 10 will cause the liquid above the impeller wobbler to be drawn downwardly toward the axis of the crank pin 16 and moved radially outwardly from the impeller wobbler and in a generally circular path around the chamber 4. The dry ingredients or material added to the liquid is moved with the stream thereof about the chamber 4 and becomes thoroughly mixed with the liquid, the vaned teeth or blades 22 operating to pulverize any lumps of dry material.

The above-described liquid impeller and seal have been found to be highly effective when used as agitating means for liquid food mixers and dispensers for animal feeding of the type disclosed in U.S. Letters Patent No. 3,208,431 issued to Dale D. Kloss. However, it will be appreciated that the same may be utilized with equal effect with various other liquid mixing operations. By disposing the core 14 as shown in FIG. 3 with the axis X—X intersecting the axis Y—Y adjacent the top central portion of the seal 11, flexing or distortion of the seal 11 is held to a minimum during operation of the impeller wobbler 10, and long effective seal life is achieved.

In the modified form illustrated in FIG. 5, the chamber bottom wall 2' has a seal receiving opening 7' therein, the opening 7' being formed to provide a radially inwardly opening circumferential groove 36. In this embodiment, the seal 11' has a generally cylindrical mounting portion 37 formed with a radially outwardly projecting circumferential bead 38 that is received in the groove 36, the portion 37 and bead 38 being anchored in the opening 7' by suitable adhesives or the like. The seal 11' is formed to provide a normally axially extending hollow hub 39 for slidable reception of core in the nature of a crank pin 40 having an outer end journal portion 41 rotatably mounted in the crank 28'. The inner end portion of the crank pin 40, inwardly of the seal 11', is flattened to provide a paddle-like impeller wobbler 42 which operates in a manner similar to the impeller wobbler 10, responsive to rotation of the crank element 28'. A conventional spring wire clamp 43 embraces the hub portion 39 of the seal 11' with sufficient pressure to sealingly anchor the crank pin 40 within the hub 39 against rotation of the impeller wobbler 42 on its own axis, and against leakage between the hub 39 and crank pin 40.

In the arrangement illustrated in FIGS. 6–8, the device of the present invention is used as a lower pressure pump. The flexible diaphragm seal, core, crank element and motor are identical to those illustrated in FIGS. 1–4 and are indicated by like reference numerals with the suffix a added. In the structure illustrated in FIGS. 6–8, wall structure provides a pump housing including an inverted cup-shaped cap 44 having a top wall 45 and a peripheral wall 46, the top wall 45 having an axial inlet opening 47 therethrough, the peripheral wall 44 having a generally tangential outlet opening 48 therein. A bottom wall 49, provided with a central opening 50, is rigidly secured to the peripheral wall 46 by a plurality of machine screws or the like 51, the bottom wall 49 being provided with a depending skirt 52 which supports the drive motor 6a. As shown, the drive motors 6 and 6a are contained within a generally cup-shaped cover 52 and 52a respectively. As shown in FIG. 8, the flexible seal 11a is mounted on the bottom wall 49 by a clamping ring or plate 25a and screws 26a. In this form of the invention, the impeller wobbler, indicated at 53, is in the nature of a flat circular plate, and is secured to the core 14a in the same manner as the impeller wobbler 10 is secured to its core 14.

The operation of the impeller wobbler 53 and seal 11a are substantially identical to the impeller wobbler 10 and seal 11, non-rotary wobbling movement of the impeller wobbler 53 causing liquid to be drawn into the pump chamber, indicated at 54 and defined by the top and bottom walls 45 and 49 respectively and the peripheral wall 46, the liquid being discharged from the chamber 54 through the outlet or discharge opening 48. The impeller wobbler 53, being devoid of teeth or blades of the type shown on the impeller wobbler 10, possesses a relatively larger surface area for engagement with the liquid to be moved thereby. When used as a pump impeller, with wall structure as shown in FIGS. 6–8, the same is highly effective in moving liquids at a substantial flow rate where high pressures are not necessary, but where a fluid tight connection between the impeller element and drive means therefor is essential.

What is claimed is:

1. Liquid impelling means and seal therefor comprising:
    (a) a flexible diaphragm seal having a marginal portion adapted to be rigidly secured in sealing engagement with a wall having a transverse opening therethrough, whereby said seal closes said opening, said seal having a normal axis extending through said opening;
    (b) a rigid core normally coaxial with said seal and sealingly anchored thereto, said core having axially inner and outer end portions at opposite sides of said seal and the latter of which projects through said wall opening when the seal is secured to said wall;
    (c) an impeller wobbler on the inner end portion of said core; and
    (d) drive means operatively engaging the outer end portion of said core and disposing the axis of said core at an oblique angle to the normal axis of the core, said drive means imparting movement to said outer end portion in a circular path about said normal axis, whereby to impart non-rotary wobbling movement to said impeller wobbler substantially on the normal axis of said seal.

2. The liquid impelling means and seal therefor, defined in claim 1, in which said drive means includes a rotary crank element having its axis of rotation coaxial with the normal axis of said seal, said core being operatively connected to said crank element radially outwardly of said axis of rotation of the crank element.

3. The liquid impelling means and seal therefor defined in claim 2, in which said core comprises a crank pin journalled to said crank element.

4. The liquid impelling means and seal therefor defined in claim 3, in which said seal is generally cup-shaped, having its central portion axially displaced from said marginal edge portion, the axis of said crank pin intersecting the common normal axis of said seal and of rotation of said crank element adjacent said central portion of the seal.

5. The liquid impelling means and seal therefor defined in claim 1, in which said impeller wobbler comprises a generally flat circular plate-like member.

6. In combination with wall structure defining a liquid chamber and having an opening therethrough to said chamber:
   (a) a flexible diaphragm seal having a marginal portion rigidly secured to said wall structure at said opening, whereby said seal closes said opening, said seal having a normal axis extending through said opening;
   (b) a rigid core normally coaxial with said seal and sealingly anchored thereto, said core having an inner end portion adjacent one side of said seal within said chamber and an opposite outer end portion spaced from the opposite side of said seal;
   (c) an impeller wobbler on the inner end portion of said core; and
   (d) drive means operatively engaging the outer end portion of said core disposing the axis of said core at an oblique angle to the normal axis of the core and imparting movement to said outer end portion in a circular path about said normal axis, whereby to impart non-rotary wobbling movement to said impeller wobbler substantially on the normal axis of said seal.

7. The combination defined in claim 6, in which said drive means includes a rotary crank element disposed outwardly of said wall structure and having its axis of rotation aligned with the normal axis of said seal, said core being operatively connected to said crank element radially outwardly of said axis of rotation of the crank element.

8. The combination defined in claim 7, in which said core comprises a crank pin, the outer end thereof being journalled to said crank element.

9. The combination defined in claim 8, in which said seal is generally cup-shaped having its central portion axially displaced from said marginal portion, the axis of said crank pin intersecting the common normal axis of said seal and of rotation of said crank element adjacent said contral portion of the seal.

10. The combination defined in claim 7, in which said wall structure comprises spaced top and bottom walls and a peripheral side wall, said impeller wobbler being disposed intermediate said top and bottom walls, said opening extending through one of said top and bottom walls, the other of said top and bottom walls having a fluid inlet therethrough to said chamber, said peripheral side wall having a fluid outlet opening therethrough from said chamber.

11. The combination defined in claim 6, in which said wall structure comprises a bottom wall and a peripheral wall extending upwardly from said bottom wall, said opening extending through said bottom wall in relatively closely spaced relation to one portion of said peripheral wall and in relatively widely spaced relation to a portion of said peripheral wall opposite said one portion thereof, whereby to dispose said impeller wobbler in relatively closely spaced relation to said one peripheral wall portion.

References Cited

UNITED STATES PATENTS

| | | | |
|---|---|---|---|
| 2,215,288 | 9/1940 | Hays | 259—99 |
| 2,449,203 | 2/1950 | Warren | 259—99 |

ROBERT W. JENKINS, *Primary Examiner.*